(12) United States Patent
Kwon et al.

(10) Patent No.: US 11,174,907 B2
(45) Date of Patent: Nov. 16, 2021

(54) FORCED NEUTRAL REMOTE START-UP CONTROL METHOD AND MANUAL TRANSMISSION VEHICLE

(71) Applicants: Hyundai Motor Company, Seoul (KR); Kia Motors Corporation, Seoul (KR)

(72) Inventors: Oh-Eun Kwon, Hwaseong-si (KR); Sun-Young Park, Busan (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 30 days.

(21) Appl. No.: 16/838,307

(22) Filed: Apr. 2, 2020

(65) Prior Publication Data

US 2021/0172484 A1   Jun. 10, 2021

(30) Foreign Application Priority Data

Dec. 4, 2019  (KR) .................. 10-2019-0159662

(51) Int. Cl.
| | | |
|---|---|---|
| *B60W 10/02* | (2006.01) | |
| *B60W 10/06* | (2006.01) | |
| *F16D 48/08* | (2006.01) | |
| *F02N 11/08* | (2006.01) | |
| *B60W 10/18* | (2012.01) | |

(52) U.S. Cl.
CPC .......... *F16D 48/08* (2013.01); *F02N 11/0807* (2013.01); *B60W 10/02* (2013.01); *B60W 10/06* (2013.01); *B60W 10/18* (2013.01)

(58) Field of Classification Search
CPC .... F16D 48/08; F02N 11/0807; B60W 10/02; B60W 10/06; B60W 10/18; B60W 2552/15; B60W 2710/021; B60W 2710/06
See application file for complete search history.

(56) References Cited

U.S. PATENT DOCUMENTS

| | | | | |
|---|---|---|---|---|
| 10,428,782 | B2* | 10/2019 | Popp | F02N 11/103 |
| 2009/0251284 | A1* | 10/2009 | Wilson | F02N 11/0807 |
| | | | | 340/5.64 |
| 2014/0256509 | A1* | 9/2014 | Cousins | F02N 11/103 |
| | | | | 477/99 |
| 2017/0349021 | A1* | 12/2017 | Cho | B60G 17/017 |
| 2018/0051758 | A1* | 2/2018 | Parada Centeno | F16D 13/00 |
| 2021/0107453 | A1* | 4/2021 | Shelton | B60W 10/182 |

FOREIGN PATENT DOCUMENTS

JP    2016089742 A    5/2016

\* cited by examiner

*Primary Examiner* — Edwin A Young
(74) *Attorney, Agent, or Firm* — Slater Matsil, LLP

(57) ABSTRACT

A forced neutral remote start-up control method is provided. The method includes performing an E-clutch neutral switching control, which confirms the presence of an E-clutch upon receiving a remote start-up request signal of an Electronic Control Unit (ECU) to form a vehicle neutral state by an E-clutch state switching before generating an engine start-up signal, and performing an engine start-up by generating the engine start-up signal after confirming the vehicle neutral state.

16 Claims, 3 Drawing Sheets

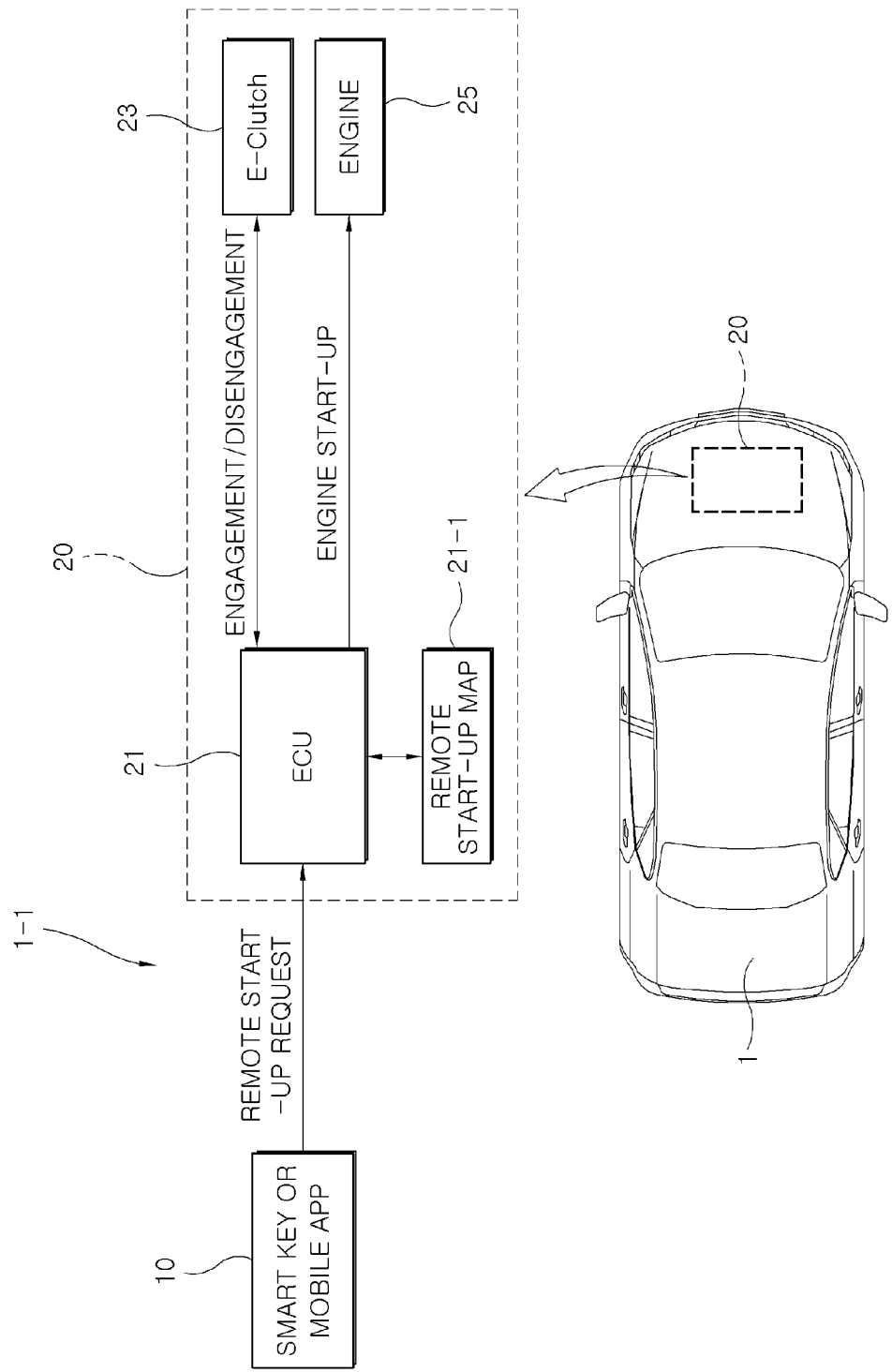

FORCED NEUTRAL REMOTE START-UP CONTROL METHOD AND MANUAL TRANSMISSION VEHICLE

CROSS-REFERENCE TO RELATED APPLICATIONS

This application claims priority to Korean Patent Application No. 10-2019-0159662, filed on Dec. 4, 2019, which application is hereby incorporated herein by reference.

TECHNICAL FIELD

The present disclosure relates to a vehicle remote start-up control.

BACKGROUND

In general, the remote start-up through the interlocking of telematics is a technology of enhancing merchantability of a vehicle.

For example, the remote start-up is implemented in a method of determining whether to perform the remote start-up for an engine after determining a brake and a shift stage by receiving the remote start-up command of the vehicle.

Therefore, the remote start-up performs the engine start-up even without the driver's direct operation in a manual transmission vehicle or an auto transmission vehicle, and in particular, the remote start-up of the auto transmission vehicle has the advantage of being capable of adjusting a vehicle interior temperature in connection with the air conditioning function.

The contents described in Description of Related Art are to help the understanding of the background of the present disclosure, and may include what is not previously known to those skilled in the art to which the present disclosure pertains.

The remote start-up technology of the Manual Transmission (MT) vehicle has a difficulty in its application because the application conditions are different from those of the remote start-up technology of the Auto Transmission (AT) vehicle.

The reason is because the robustness of a neutral switch should be secured in order for the remote start-up technology to be applied to the MT vehicle but the neutral switch applied to the MT vehicle has a difficulty in the failure diagnosis for securing robustness.

For example, in the MT vehicle, it is difficult to accurately determine whether the current gear necessary to be used as an engine start-up entry condition of the remote start-up is engaged, and the neutral confirmation result of the neutral switch should be confirmed in a state where the switch does not fail but it is difficult to diagnose the failure of the switch. Therefore, in the MT vehicle, since there is a possibility of accelerating the vehicle by the cranking in the gear-engaged state upon the engine start-up by the remote start-up, it is very difficult to apply the remote start-up. Here, the cranking means the rotation of a crankshaft by a force applied from the outside such as a start-up/drive motor.

Furthermore, since the MT vehicle is replacing a mechanical clutch with an E-clutch to achieve the effects of increasing the driver's convenience and enhancing fuel efficiency, the application to the remote start-up is further required.

SUMMARY

The present disclosure relates to a vehicle remote start-up control. Particular embodiments relate to a manual transmission vehicle having a remote start-up system capable of a forced neutral remote start-up control by using an E-clutch (electronic clutch) for the remote start-up.

An embodiment of the present disclosure considering the above point provides a forced neutral remote start-up control method and a manual transmission vehicle, which satisfy the remote start-up condition by forcing the neutral state of the vehicle in a control of the E-clutch upon the remote start-up through a combination of the manual transmission and the E-clutch, and in particular, response to the remote start-up request by disengaging the E-clutch that is in an always engaged state even in an ignition off (IG. OFF) state, thereby enabling the remote start-up of the engine without the risk of accelerating the vehicle even if the driver has parked with the gear stage arbitrarily engaged.

A forced neutral remote start-up control method according to embodiments of the present disclosure includes an E-clutch neutral switching control, which confirms the presence of an E-clutch upon receiving a remote start-up request signal of an Electronic Control Unit (ECU) to form a vehicle neutral state by an E-clutch state switching before generating an engine start-up signal, and performs an engine start-up by generating the engine start-up signal after confirming the vehicle neutral state.

As a preferred embodiment, the E-clutch state switching is from clutch engagement to clutch disengagement, the clutch disengagement is performed by generating a clutch disengagement signal of the ECU, and in the clutch disengagement, a clutch disengagement switching signal is transmitted to the ECU for confirming the vehicle neutral state.

As a preferred embodiment, the E-clutch neutral switching control is performed by determining a vehicle neutral that confirms the IG. OFF of an engine by the ECU, preparing an engine start-up that generates, by the ECU, a clutch disengagement signal for the E-clutch, determining E-clutch disengagement that confirms the vehicle neutral state by receiving, by the ECU, a clutch disengagement switching signal generated after the engagement of the E-clutch has been switched to the disengagement, and performing the engine start-up upon confirming the vehicle neutral state.

As a preferred embodiment, the E-clutch is not released on a road slope that is identified as a predetermined road slope or more. A braking function of a brake based on inclination information is activated before the E-clutch disengagement.

As a preferred embodiment, the E-clutch connects an engine with a manual transmission.

As a preferred embodiment, the remote start-up request signal is generated in any one among a smart key, a smart phone, and a Personal Digital Assistant (PDA) terminal.

Further, a manual transmission vehicle according to embodiments of the present disclosure includes a remote start-up device for generating a remote start-up request signal, an ECU for transmitting a clutch disengagement signal to an E-clutch recognized in an IG. OFF state of an engine upon receiving the remote start-up request signal so that clutch engagement is switched to the disengagement, and performing an engine start-up by confirming the disengagement state of the E-clutch as a vehicle neutral state, and an E-clutch for delivering and blocking power of the engine by engaging and disengaging a clutch state in a control of the ECU.

As a preferred embodiment, the ECU performs transmission and reception with the remote start-up device via a short range wireless network, and performs transmission and reception with the E-clutch and the engine via a Controller Area Network (CAN).

As a preferred embodiment, the remote start-up device includes a smart key, a mobile app of a smart phone or a PDA terminal.

As a preferred embodiment, the E-clutch forms the always engaged state upon the IG. OFF.

The forced neutral remote start-up control applied to the remote start-up system of the manual transmission vehicle according to embodiments of the present disclosure implements the following operations and effects.

Firstly, it is possible to simulate the neutral, instead of the neutral switch that lacks the robustness, by the E-clutch capable of forcibly disengaging the engaged state, thereby stably implementing the remote start-up in the MT vehicle to which the manual transmission and the E-clutch system have been applied. Secondly, it is possible to disengage the E-clutch that is in the always engaged state even in the IG. OFF state by the remote start-up request through the smart key, the mobile app or the Personal Digital Assistant (PDA) terminal of user, thereby performing the engine start-up without the risk of accelerating the vehicle even if the driver has parked with the gear stage arbitrarily engaged. Thirdly, it is possible to reliably know the current engagement/disengagement states by using the select and shift sensor of the shift lever for detecting the lever position to diagnose the failure of the E-clutch, thereby greatly reinforcing the stability of the remote start-up.

BRIEF DESCRIPTION OF THE DRAWINGS

FIG. 3 is a diagram illustrating an operating state where the remote start-up system of the manual transmission vehicle according to embodiments of the present disclosure performs the forced neutral remote start-up control.

DETAILED DESCRIPTION OF ILLUSTRATIVE EMBODIMENTS

Hereinafter, embodiments of the present disclosure will be described in detail with reference to the accompanying drawings, and since the embodiments may be implemented in various different forms by those skilled in the art to which the present disclosure pertains, as an example, they are not limited to the embodiments described herein.

Figure 1:
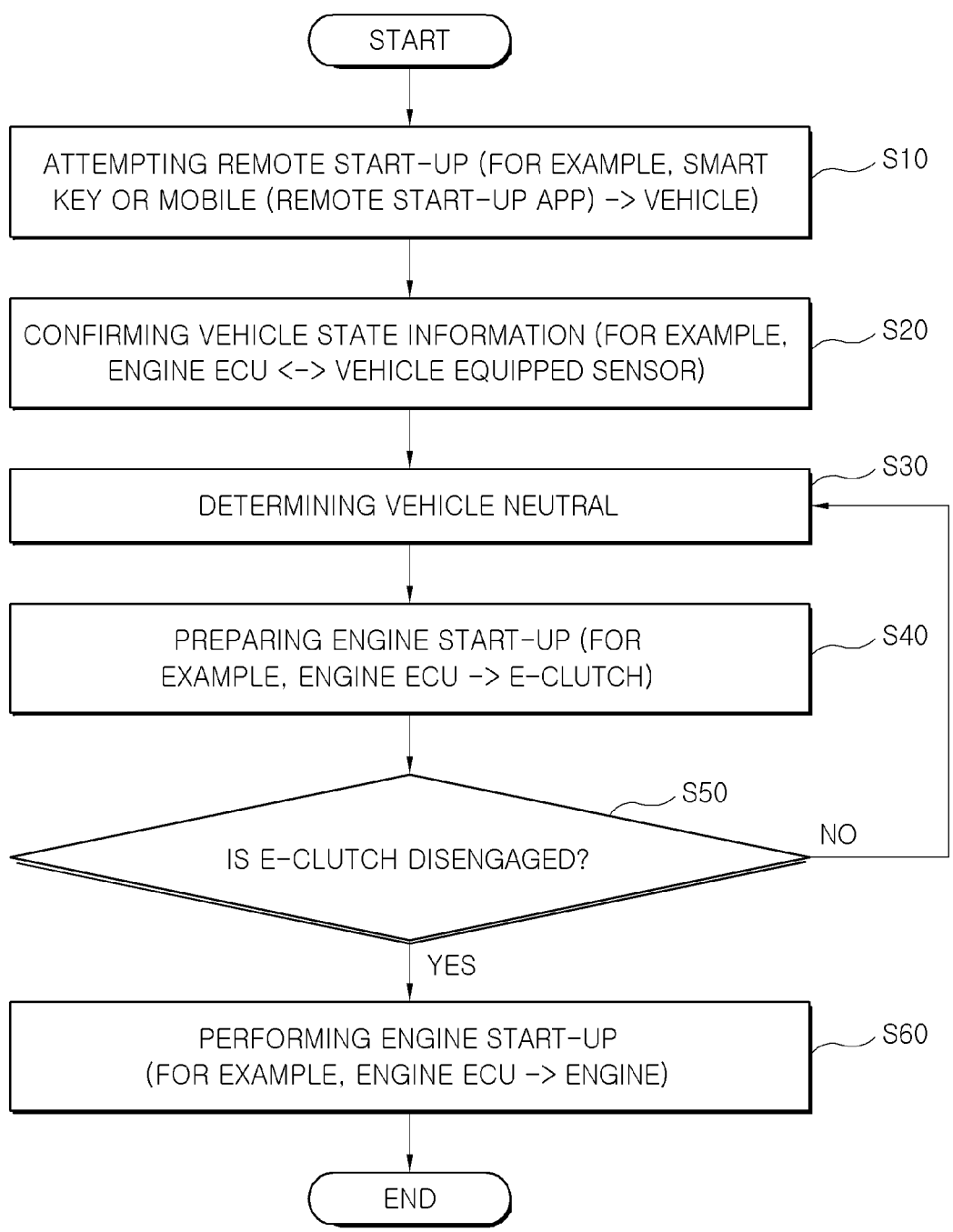
FIG. 1 is a flowchart of a forced neutral remote start-up control method according to embodiments of the present disclosure.

Referring to FIG. 1, a forced neutral remote start-up control method confirms vehicle information according to a remote start-up request (S10 and S20) and then performs an E-clutch neutral switching control of simulating the neutral by an E-clutch that is in an always engaged state in an IG. OFF state (S30 to S60), thereby securing stability of the remote start-up while eliminating the remote start-up restraints on a MT vehicle caused by the lack of the robustness of a neutral switch.

Therefore, the forced neutral remote start-up control method may allow the MT vehicle to forcibly implement the vehicle neutral situation through an E-clutch system connected with a manual transmission when the remote engine start-up is requested, and even if the driver has parked with a gear stage arbitrarily engaged when the engine start-up is performed, it is possible to perform the engine start-up while preventing the unintended acceleration of the vehicle.

Figure 2:
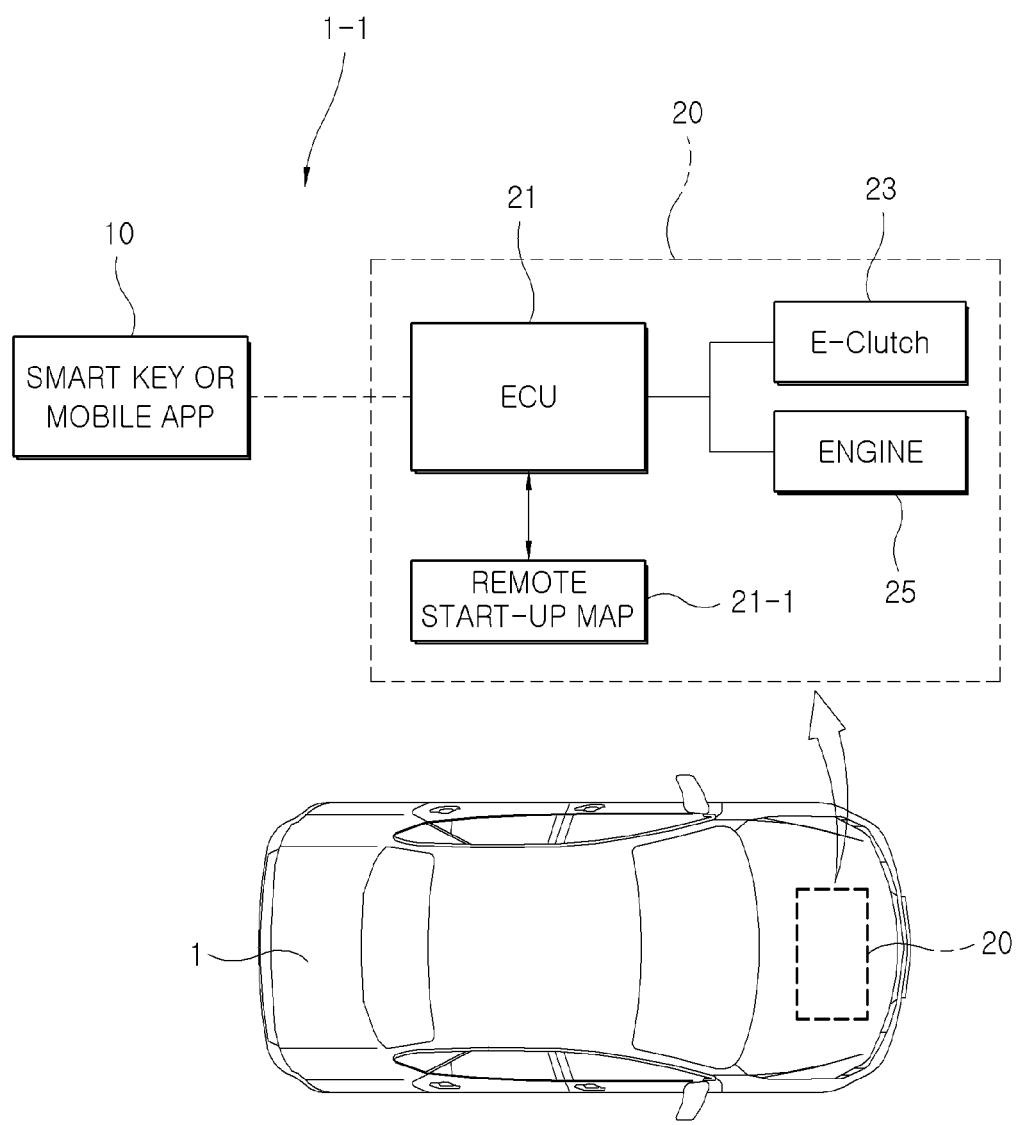
FIG. 2 is a diagram illustrating an example of a manual transmission vehicle to which a vehicle remote start-up system implementing the forced neutral remote start-up control according to embodiments of the present disclosure has been applied.

Referring to FIG. 2, a remote start-up system 1-1 is composed of a remote start-up device 10 and an engine system 20 to perform the remote start-up for a vehicle 1.

Specifically, the remote start-up device 10 applies a smart key, a mobile app of a smart phone or a Personal Digital Assistant (PDA) terminal. The engine system 20 includes an Electronic Control Unit (ECU) 21, an E-clutch 23, and an engine 25, and the E-clutch 23 is operated by a control signal of the ECU 21 to engage and disengage the engine 25 with a manual transmission (not illustrated) to deliver or block the power of the engine 25 to the manual transmission.

Therefore, the manual transmission vehicle 1 is a manual transmission vehicle having the manual transmission and the E-clutch system.

In particular, the ECU 21 is an engine controller for controlling the engine 25, controls the engagement and disengagement operations of the E-clutch 23, and transmits and receives a signal with the remote start-up device 10 to control the operation of the E-clutch 23 in response to the remote start-up request. In this case, the ECU 21 uses a short range wireless network such as Bluetooth as a communication network for the remote start-up device 10, and uses a Controller Area Network (CAN) as a communication network for the E-clutch 23 and the engine 25.

Further, the ECU 21 is connected with a remote start-up map 21-1, and the remote start-up map 21-1 has an E-clutch failure diagnosis matching table for the lever position detected by the select/shift sensor of an operation lever to provide the E-clutch disengagement signal output information of the ECU 21.

Hereinafter, the forced neutral remote start-up control method of FIG. 1 will be described in detail with reference to FIG. 3. In this case, the control subject is the ECU 21 connected with the remote start-up device 10, and the control target is the E-clutch 23 and the engine 25.

First, the ECU 21 receives a remote start-up request signal transmitted from the remote start-up device 10 in attempting a remote start-up (S10), and performs confirming vehicle state information (S20).

Referring to FIG. 3, the remote start-up request signal is transmitted from a smart key, a mobile app of a smart phone or a PDA terminal, which is the remote start-up device 10, and the ECU 21 receives it through a short range wireless network to enter a remote start-up preparation state in the ECU 21.

Further, the ECU 21 reads the information of various vehicle equipped sensors (for example, a select/shift sensor, an E-clutch ON/OFF sensor, a start-up key ON/OFF sensor, a vehicle speed sensor, an engine RPM sensor, an accelerator/brake pedal sensor, an inclination sensor and the like) mounted to the vehicle 1 by entering the remote start-up preparation state and confirms the state of the vehicle 1 upon receiving the remote start-up request signal.

In particular, in the confirming vehicle state information (S20), it is determined whether a road slope is inclined by using inclination information (or a road gradient) of the inclination sensor and the like, and stops without releasing the E-clutch at the inclination information confirmed by a predetermined road slope or more.

Subsequently, the ECU 21 enters determining the neutral of the vehicle (S30), and performs preparing the engine start-up (S40) and then determining the E-clutch disengagement (S50).

Referring to FIG. 3, the ECU 21 confirms the engagement state of the E-clutch 23 in the engine stop state with the information of the E-clutch ON/OFF sensor among the information read while matching the information of various vehicle equipped sensors with the remote start-up map 21-1. Subsequently, the ECU 21 performs the determining of the neutral of the vehicle (S30) in the IG. OFF state of the engine and then transmits an E-clutch disengagement signal to a clutch controller of the E-clutch 23, thereby performing the preparing of the engine start-up for switching the engagement state of the E-clutch 23 to the disengagement state (S40).

As a result, the determining of the E-clutch disengagement (S50) is performed by receiving, by the ECU 21, the E-clutch disengagement signal transmitted by the clutch controller of the E-clutch 23. From this, the ECU 21 may utilize the characteristics capable of the lever position and the failure diagnosis of the E-clutch by using the sensor (select, shift) of the operation lever to perform the disengagement switching required for the remote start-up because the E-clutch is always in the clutch engaged state during the IG. OFF in a state of having reliably recognized the current engagement/disengagement states of the E-clutch 23.

In particular, the determining of the E-clutch disengagement (S50) includes the step of activating a skid prevention (that is, anti-skid) function before the E-clutch disengagement by the braking function of the brake based on inclination information (or a road gradient) of the inclination sensor.

Finally, the ECU 21 enters performing the engine start-up (S60) to perform the engine start-up in response to the remote start-up request.

Referring to FIG. 3, the ECU 21 confirms that the current state of the E-clutch 23 is in the clutch disengagement state and then outputs the engine start-up signal to the engine 25, thereby performing the start-up of the engine 25 in response to the remote start-up request of the remote start-up device 10.

As described above, the vehicle 1 having the manual transmission connected with the E-clutch 23 may disengage the E-clutch for the remote start-up, and implement the forced vehicle neutral through the disengagement of the E-clutch, thereby performing the engine start-up without the risk of accelerating the vehicle 1 even when parking in the driver's gear stage engaged state upon the start-up of the engine 25.

As described above, the forced neutral remote start-up control method implemented in the remote start-up system 10 of the manual transmission vehicle 1 according to the present embodiment includes the E-clutch neutral switching control that transmits the clutch disengagement signal to the E-clutch 23 recognized in the IG. OFF state of the engine upon receiving the remote start-up request signal of the Electronic Control Unit (ECU) 21 so that the clutch engagement is switched to the disengagement, and performs the engine start-up by confirming the disengagement state of the E-clutch as the vehicle neutral state, thereby enabling the remote start-up that satisfies the remote start-up condition of the MT vehicle only with the application of the E-clutch, instead of the neutral switch that the failure diagnosis is difficult for securing the robustness, and in particular, prevents the risk of accelerating the vehicle caused when the driver parks with the gear stage arbitrarily engaged by the disengagement of the E-clutch.

What is claimed is:

1. A forced neutral remote start-up control method comprising:

performing an E-clutch neutral switching control, which confirms a presence of an E-clutch upon receiving a remote start-up request signal by an Electronic Control Unit (ECU), to form a vehicle neutral state by an E-clutch state switching before generating an engine start-up signal;

utilizing, by the ECU, characteristics capable of a failure diagnosis of the E-clutch by using an operation lever to perform disengagement switching required for the remote start-up; and performing an engine start-up by generating the engine start-up signal after confirming the vehicle neutral state.

2. The forced neutral remote start-up control method of claim 1, wherein the E-clutch state switching is from clutch engagement to clutch disengagement, and the clutch disengagement is performed by generating a clutch disengagement signal of the ECU.

3. The forced neutral remote start-up control method of claim 2, wherein in the clutch disengagement, a clutch disengagement switching signal is transmitted to the ECU for confirming the vehicle neutral state.

4. The forced neutral remote start-up control method of claim 1, wherein performing the E-clutch neutral switching control comprises:

confirming an IG. OFF state of an engine, the IG. OFF state indicating an ignition is off;

generating a clutch disengagement signal by the E-clutch;

confirming the vehicle neutral state by a clutch disengagement switching signal generated after engagement of the E-clutch has been switched to disengagement; and performing the engine start-up upon confirming the vehicle neutral state.

5. The forced neutral remote start-up control method of claim 4, wherein the IG. OFF state is confirmed in the ECU.

6. The forced neutral remote start-up control method of claim 4, wherein the clutch disengagement signal is generated in the ECU.

7. The forced neutral remote start-up control method of claim 4, wherein the clutch disengagement switching signal is generated in the E-clutch, and is used to confirm the vehicle neutral state in the ECU.

8. The forced neutral remote start-up control method of claim 4, wherein the engine start-up is performed by generating the engine start-up signal in the ECU.

9. The forced neutral remote start-up control method of claim 4, wherein the E-clutch is not released on a road slope that is identified as a predetermined road slope or more.

10. The forced neutral remote start-up control method of claim 4, wherein a braking function of a brake based on inclination information is activated before the E-clutch disengagement.

11. The forced neutral remote start-up control method of claim 1, wherein the E-clutch connects an engine with a manual transmission.

12. The forced neutral remote start-up control method of claim 1, wherein the remote start-up request signal is generated by a smart key, a smart phone, or a PDA terminal.

13. A manual transmission vehicle, comprising:

an Electronic Control Unit (ECU) configured to performing an E-clutch neutral switching control, which confirms a presence of an E-clutch upon receiving a remote start-up request signal by the ECU, to form a vehicle neutral state by an E-clutch state switching before generating an engine start-up signal, and to utilize characteristics capable of a failure diagnosis of the E-clutch by using an operation lever to perform disengagement switching required for a remote start-up; and a remote start-up device configured to generate the remote start-up request signal;

wherein the ECU is further configured to transmit a clutch disengagement signal to the E-clutch recognized in an IG. OFF state of an engine upon receiving the remote start-up request signal so that clutch engagement is switched to disengagement, and to perform an engine start-up by generating the engine start-up signal after confirming a disengagement state of the E-clutch as the vehicle neutral state; and wherein the E-clutch is configured to deliver and block power of the engine by engaging and disengaging, respectively, a clutch state in a control of the ECU.

14. The manual transmission vehicle of claim 13, wherein the ECU is configured to perform transmission and reception with the remote start-up device via a short range wireless network, and to perform transmission and reception with the E-clutch and the engine via a Controller Area Network (CAN).

15. The manual transmission vehicle of claim 13, wherein the remote start-up device comprises a smart key, a mobile app of a smart phone or a Personal Digital Assistant (PDA) terminal.

16. The manual transmission vehicle of claim 13, wherein the E-clutch is configured to form an always engaged state in the IG. OFF state.

* * * * *